(12) United States Patent
McCarthy et al.

(10) Patent No.: US 7,979,061 B2
(45) Date of Patent: Jul. 12, 2011

(54) HANDSET PERSONALISATION

(75) Inventors: Kevin McCarthy, Vaerloese (DK); Lone Tram Soerensen, Roskilde (DK); Niels Nymark, Hilleroed (DK); Mauro Montanaro, Singapore (SG); Allan Suonpera, Helsinki (FI)

(73) Assignee: Nokia Corporation, Espoo (FI)

( * ) Notice: Subject to any disclaimer, the term of this patent is extended or adjusted under 35 U.S.C. 154(b) by 1538 days.

(21) Appl. No.: 09/942,761

(22) Filed: Aug. 31, 2001

(65) Prior Publication Data

US 2002/0044149 A1 Apr. 18, 2002

(30) Foreign Application Priority Data

Aug. 31, 2000 (GB) .................................. 0021451.0

(51) Int. Cl.
H04N 3/00 (2006.01)
(52) U.S. Cl. ...................................................... 455/418
(58) Field of Classification Search ................... 345/636, 345/619, 467; 455/456, 418
See application file for complete search history.

(56) References Cited

U.S. PATENT DOCUMENTS

| 4,866,766 | A | | 9/1989 | Mitzlaff |
| 4,868,561 | A | | 9/1989 | Davis |
| 4,899,373 | A | | 2/1990 | Lee et al. |
| 5,381,138 | A | | 1/1995 | Stair et al. |
| 5,418,837 | A | | 5/1995 | Johansson et al. |
| 5,479,476 | A | * | 12/1995 | Finke-Anlauff .............. 455/566 |
| 5,794,142 | A | | 8/1998 | Vanttila et al. |
| 5,973,612 | A | * | 10/1999 | Deo et al. ...................... 340/7.58 |
| 6,094,587 | A | * | 7/2000 | Armanto et al. .............. 455/567 |
| 6,104,924 | A | | 8/2000 | Shirai |
| 6,226,367 | B1 | * | 5/2001 | Smith et al. .............. 379/142.04 |
| 6,442,263 | B1 | * | 8/2002 | Beaton et al. ............ 379/142.04 |
| 6,603,969 | B1 | * | 8/2003 | Vuoristo et al. ............... 455/433 |
| 6,658,254 | B1 | * | 12/2003 | Purdy et al. .................... 455/445 |
| 6,675,008 | B1 | * | 1/2004 | Paik et al. ...................... 455/415 |
| 6,694,356 | B1 | * | 2/2004 | Philyaw ........................ 709/217 |
| 6,816,719 | B1 | * | 11/2004 | Heinonen et al. ............. 455/403 |
| 7,158,805 | B1 | * | 1/2007 | Park et al. ...................... 455/519 |
| 2002/0069220 | A1 | * | 6/2002 | Tran .............................. 707/503 |

FOREIGN PATENT DOCUMENTS

| EP | 0 611 070 A2 | 8/1994 |
| EP | 0611070 A2 | 8/1994 |
| EP | 0851649 A2 | 1/1998 |
| GB | 2 305 073 A | 3/1997 |
| JP | 08-186855 A | 7/1996 |
| JP | 08-186855 A | 7/1996 |
| JP | 10-215321 A | 8/1998 |

(Continued)

OTHER PUBLICATIONS

JP Patent Application No. 2002-523835, Notification of ground of rejection, transmission date Feb. 7, 2011.

(Continued)

*Primary Examiner* — Aaron M Richer
(74) *Attorney, Agent, or Firm* — Banner & Witcoff, Ltd.

(57) ABSTRACT

A communication terminal has a number of user selectable profiles each including a group of user adjustable operating characteristics. These selectable profiles may be transferred from one communication terminal to another included in a message containing a group of user adjustable operating characteristics. When the communication terminal receives this message transmitted via a communication channel, the message is analyzed and the terminal saves the group of user adjustable operating characteristics as a profile.

32 Claims, 7 Drawing Sheets

FOREIGN PATENT DOCUMENTS

| | | |
|---|---|---|
| JP | 11-331904 A | 11/1999 |
| JP | 2000-115304 A | 4/2000 |
| WO | WO92/03891 | 3/1992 |
| WO | WO 92/03891 | 3/1992 |
| WO | WO 98/17045 | 4/1998 |
| WO | WO 00/54530 | 9/2000 |

OTHER PUBLICATIONS

JP 2002-523835, Notification of Ground of Rejection, date of transmission Aug. 25, 2010.

* cited by examiner

HANDSET PERSONALISATION

BACKGROUND OF THE INVENTION

1. Field of the Invention

The invention relates to the personalisation of a communication terminal, e.g. hand-portable phone.

2. Description of Prior Art

During the past few years cellular terminals have changed appearance from heavy break-like formed electronic boxes to attractive designs. Furthermore the users want to personalize their phones by using colored, exchangeable covers, certain ringing tones, etc.

During the past years it has been possible to download operator logos and ringing tones from the Internet due to the Nokia Smart Messaging Platform described in the Smart Messaging Specification, revision 1.0.0; Sep. 15, 1997.

In U.S. Pat. No. 6,094,587 there is described a method for programming a ringing tone of a telephone in a format that may be transferred from one telephone to another, e.g., in a short message.

U.S. Pat. No. 5,479,476 describes the use of profiles in mobile terminals whereby the user by means of a few key presses may change the alerting of the terminal in order to fit into the requirements of the environment. This is very convenient for the user when moving from a noisy environment, e.g., factory or street, into a silent environment, e.g., a meeting room, a theater, or a restaurant. The users highly appreciate these profiles.

SUMMARY OF THE INVENTION

According to a first aspect of the invention there is provided method of handling operating characteristics of a profile in a communication terminal, said communication terminal has a number of user selectable profiles each including a group of user adjustable operating characteristics, comprising reception of a message including a group of user adjustable operating characteristics from a remote terminal sent via a communication channel, and saving said group of user adjustable operating characteristics as a profile in said communication terminal. Hereby it becomes possible to define new profiles in a terminal by transmitting a profile from another remote profile via the communication network (over the air).

Preferably the transmitted profile message includes a ringing tone and at least one graphical picture which is stored in a profile selected by the user. It is also possible to include a calendar note and/or a bookmark in the profile message. The remote terminal can be a server, which may provide promotional content and/or event driven content. According to the preferred embodiment of the invention, the communication terminal allows the user to discard a received profile message after inspection of items included in the profile message. The data contained in the profile message includes according to the preferred embodiment a plurality of individual pictures, and the pictures are displayed successively in order to create an animation. The profile message may furthermore include a name label for the profile.

According to a second aspect of the invention there is provided a communication terminal having a number of user selectable profiles each including a group of user adjustable operating characteristics, and comprising means for receiving messages, means for analyzing the message type and for detecting user adjustable operating characteristics when present in the message, and means for storing user adjustable operating characteristics as one of the number of user selectable profiles available in the communication terminal.

According to a third aspect of the invention there is provided a method of providing operating characteristics for a profile for a communication terminal, the communication terminal including a number of user selectable profiles each including a group of user adjustable operating characteristics, comprising arranging a group of user adjustable operating characteristics in a message having a predetermined message format, and transmitting the message to the communication terminal via a communication channel.

According to a fourth aspect of the invention there is provided a communication terminal having a number of user selectable profiles each including a group of user adjustable operating characteristics, and comprising means for arranging a group of user adjustable operating characteristics in a message having a predetermined message format, and means for transmitting said message to the communication terminal via a communication channel.

According to a fifth aspect of the invention there is provided a method of handling operating characteristics of a communication terminal, where the communication terminal has a number of user selectable groups of user adjustable operating characteristics, and comprising the reception of a message including a group of user adjustable operating characteristics from a remote terminal transmitted via a communication channel, and saving the group of user adjustable operating characteristics individually in each selectable group in the communication terminal. In a preferred embodiment of this fifth aspect of the invention, the message may include a ringing tone and at least one graphical picture, which is stored in a corresponding user selectable group. It also possible to include a calendar note and/or a bookmark, for being stored in a corresponding user selectable group.

According to a sixth aspect of the invention there is provided a remote terminal comprising operating characteristics for a communication terminal, where the communication terminal has a number of user selectable groups of user adjustable operating characteristics, and the remote terminal comprises bundling means to generate a message including a group of user adjustable operating characteristics, and transmitting means to transfer the message to the communication terminal via a communication channel, where the communication terminal is able to save the group of user adjustable operating characteristics individually in each selectable group in the communication terminal.

BRIEF DESCRIPTION OF THE DRAWING

For a better understanding of the present invention and to understand how the same may be brought into effect reference will now be made by way of example only to the accompanying drawings in which.

DETAILED DESCRIPTION OF THE INVENTION

Figure 1:
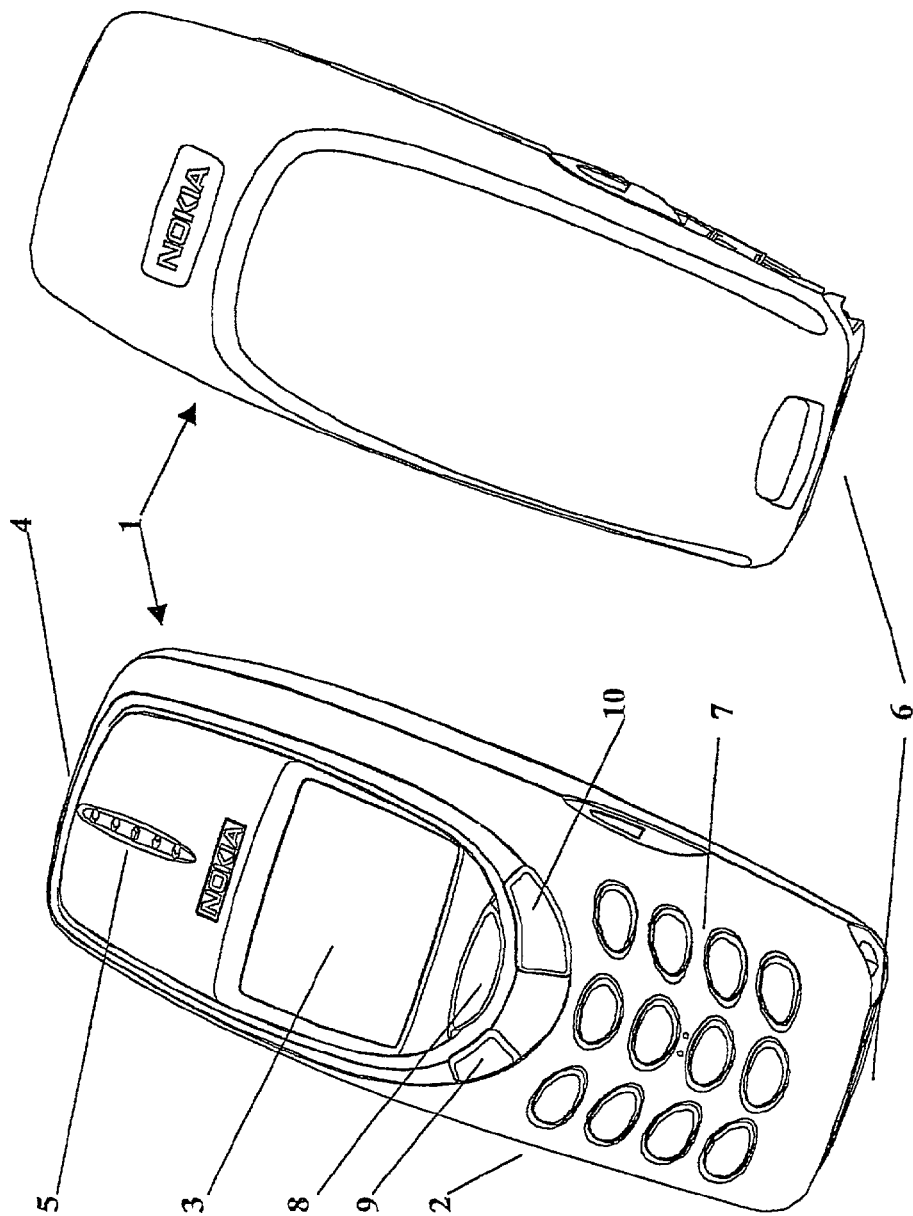
FIG. 1 illustrates a preferred embodiment of a communication terminal according to the invention.

FIG. 1 shows a preferred embodiment of a phone according to the invention, and it will be seen that the phone, which is generally designated by 1, comprises a user interface having a keypad 2, a display 3, an on/off button 4 (present in the top of the phone and therefore not visible in the present view), a speaker 5, and a microphone 6 (openings present in the bottom of the phone and therefore not visible in the present view). The phone 1 according to the preferred embodiment is adapted for communication via a cellular network, such as the GSM 900/1800 MHz network.

According to the preferred embodiment the keypad 2 has a first group 7 of keys as alphanumeric keys, one softkey 8, a cursor navigation key 10 (scroll up/down), and a "clear"-key 9 for erasing letters in text in the display 3, jumping steps down in the menu structure and rejecting calls. The present functionality of the soft key 8 is shown in separate fields (softkey-label) in the display 3 just above the softkey 8. The softkey 8 is a multifunction key and its present function depends on the state of the phone 1. The softkey 8 gives access to the menu, the phonebook and call handling.

Figure 2:
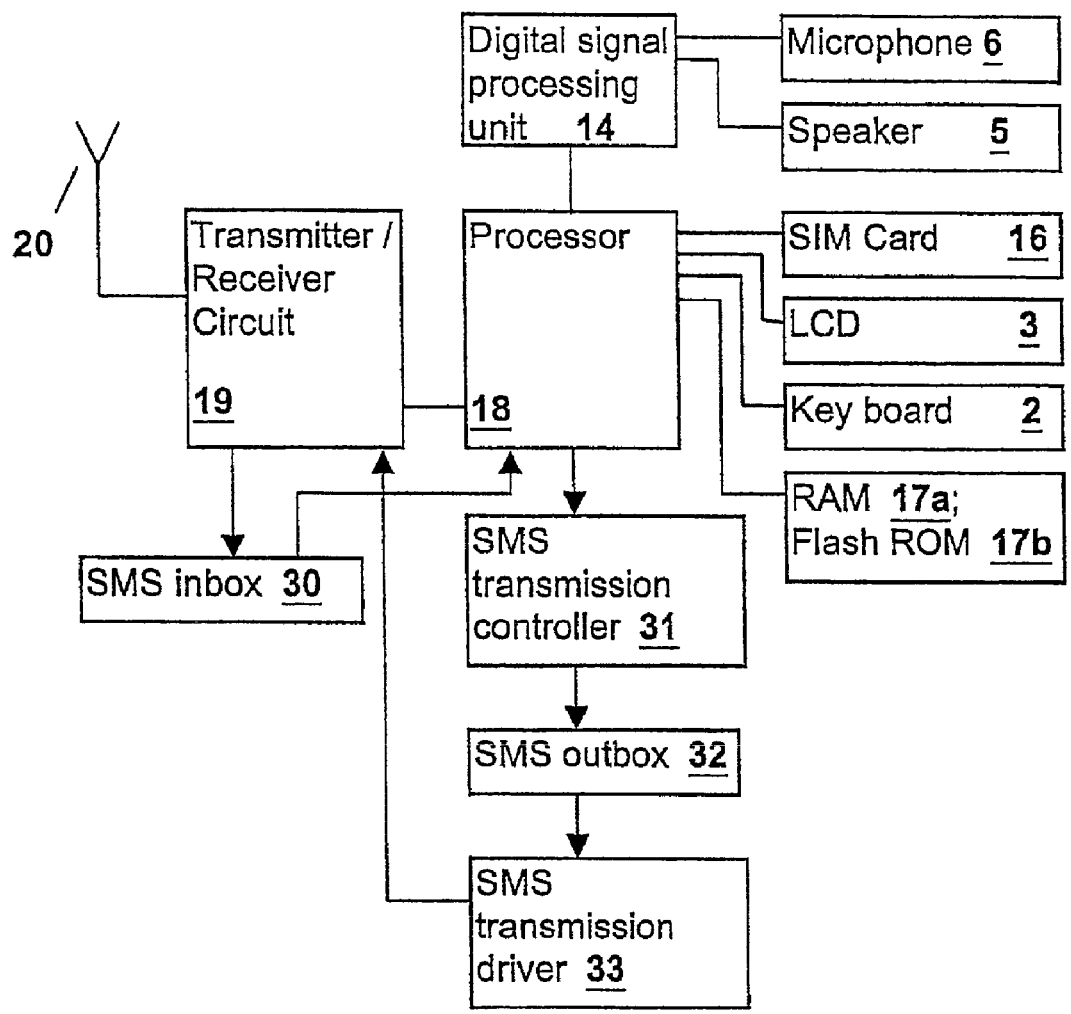
FIG. 2 schematically shows parts of a communication terminal for communication with a cellular network.

FIG. 2 schematically shows the most important parts of a preferred embodiment of the phone, the parts being essential to the understanding of the invention. The processor 18 controls communications with the network via the transmitter/receiver circuit 19 and an internal antenna 20.

The microphone 6 transforms the user's speech into analog signals, the analog signals formed thereby are A/D converted in an A/D converter (not shown) before the speech is encoded in a digital signal processing unit 14 (DSP). The encoded speech signal is transferred to the processor 18, which supports the GSM terminal software. The processor 18 also forms the interface to the peripheral units of the apparatus, including a RAM memory 17a and a Flash ROM memory 17b, a SIM card 16, the display 3 and the keypad 2 (as well as data, power supply, etc.). The digital signal-processing unit 14 speech-decodes the signal, which is transferred from the processor 18 to the earpiece 5 via a D/A converter (not shown).

The mobile station main control circuit, including the processor 18 (can be implemented as several micro-controllers) and blocks 30-33 for controlling transmission of profiles as short messages according to the present invention. The blocks 30-33 can be interpreted as a data processing unit of the terminal, which can be formed in full by programming the processor 18.

In the following the operation of the terminal will be discussed with focus on the transmission of profiles including ringing tones, graphics and name of the profile. By means of the user interface (keyboard 2 and the display 3), the desired profile is retrieved from the memory. When the user enters a command to send a profile, the processor 18 forms a message including a standard message header, and the content of the message data line has a sequence of characters forming an identifier at the beginning of the line followed by a sequence of bits representing the profile including the elements of the profile.

The processor 18 comprises character transformation functions, which have been implemented as software, and by means of which the processor 18 processes the characters. The processor 18 transfers the line of characters formed to an SMS transmission controller 31, which adds to the message header including message address information, i.e., the information on the destination on the basis of the user input information. The transformation of the profile and its individual elements into characters is preferably implemented as an application program that is run by the processor 18.

When the address information has been added at the SMS transmission controller 31, the message is transferred into an outbox 32, which sends the message, and which has access to a buffer, in which the message is stored until a successful transmission has been reported. If the transmission fails, the outbox 32 re-transmits the message. When the transmitter/receiver circuit 19 has network coverage and is idle, the message is transferred to an SMS transmission driver circuit 33 by the controller 18 which adds the header to the message information relating to the mobile communications system in question, such as validity information (which indicates in which direction the message is going, i.e., from a mobile station to a message service center or vice versa), processes the address information into a form required by the mobile communications system, and adds to the message the address of the message service center, as well as the short message identifier, and forms the information to be transmitted, e.g., a digital signal for a transmitter 19.

The operations provided by the processor 18, the SMS transmission control unit 31, the SMS outbox 32 and the SMS transmission driver 33 can also be provided as an application run on a Personal Computer 58 (see FIG. 5), which may have a connection to a short message service center via the Internet.

When a communication terminal 1 receives a profile included in a short message, the message is received through the transmitter/receiver unit 19 and is passed into a destination box or an inbox 9 of the data processing unit including a memory for storing the message. The received message can be stored in a memory located in the SIM card. First the type of message is detected, and if the received message is an ordinary short message, the processor 18 notifies in the display 3 that short message received.

If the message has an identifier indicating that the message includes a profile, the processor 18 will further search for an element identifying the individual elements of the profile. When the elements have been identified, the processor 18 starts to process the received data. For the name of the profile, the processor 18 performs a transformation of the binary characters into ASCII characters and identifies the text label as the name of the profile. For the ringing tone element, the processor 18 performs a transformation of the binary characters into ASCII characters and further the transformation of the ASCII characters into a ringing tone. For the graphic element, the processor 18 performs a transformation of the binary characters into a bit map file with the dimensions given in the element identifier, and if it is an animation the transformation is repeated for each image. All the individual elements are stored in a temporary memory.

Firstly the user may be asked whether to accept or reject, i.e. whether to store the profile in the permanent memory or not. If the user accepts the profile the processor 18 makes the profile available in the terminal for the user.

The profile concept has been discussed in detail in the assignees U.S. Pat. No. 5,479,476. According to the preferred embodiment of the invention it will be possible to set the phone tones and profile graphic to work in a desired manner by selecting the desired setting group or "profile". This makes it easy to adjust the phone for different events and environments.

Figure 3:
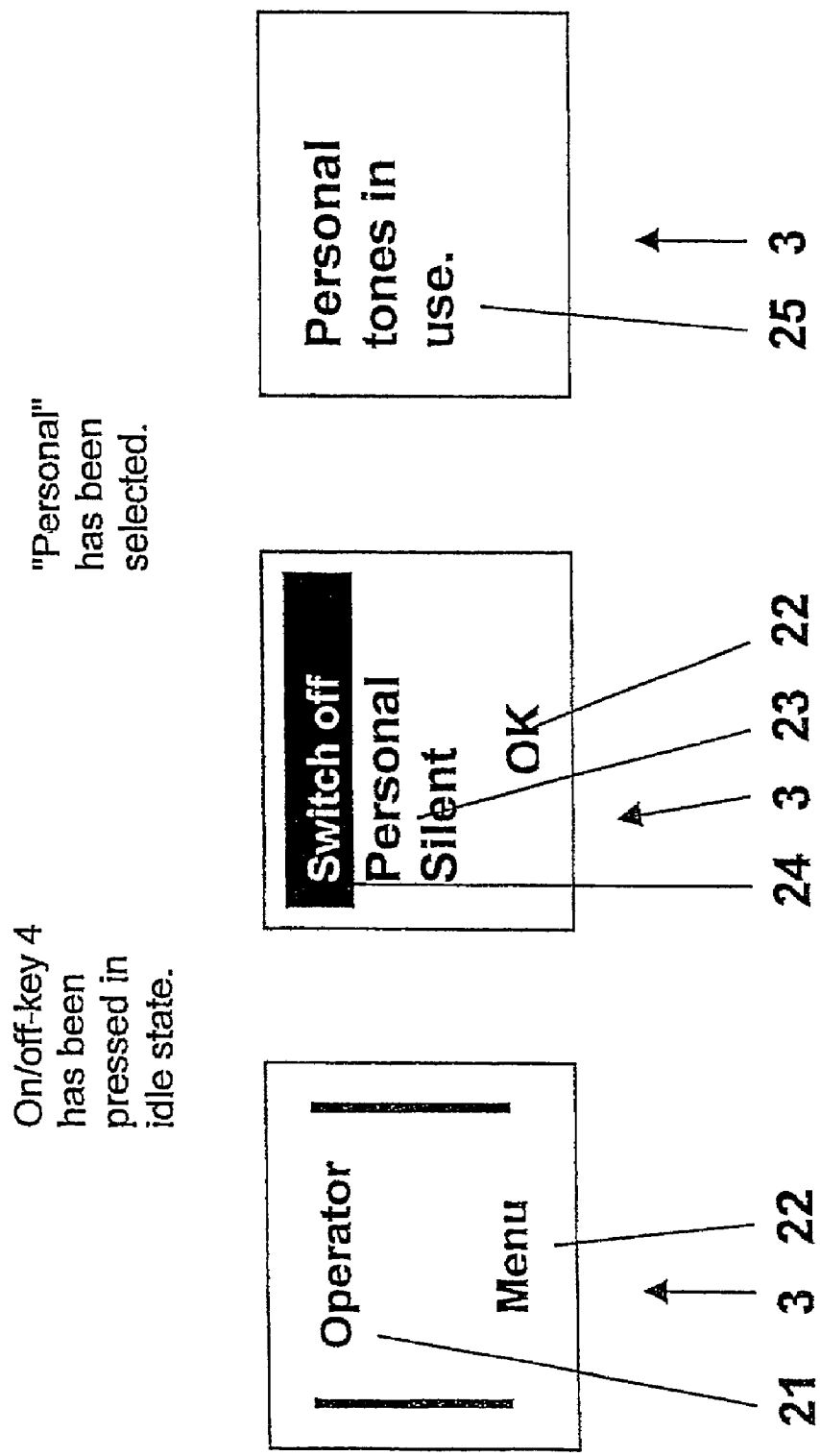
FIG. 3 shows a sequence of display for profile selection in a preferred embodiment of a communication terminal according to the invention.

With reference to FIG. 3 there is shown a short cut feature in the phone for selecting the desired profile. The idle state display (idle state is the home state of the phone in which it is waiting for any input from a user or a network), of the preferred embodiment of the phone according to the invention is shown as the first display in the sequence. The display 3 includes an operator logo 21 and a softkey label 22. By briefly pressing the "on/off"-key 4, the selectable profiles will be listed as selectable items 23 as an endless list in the display 3 together with a "switch off" the phone option. The desired profile is selected by moving a cursor 24 among the selectable items 23—according to the preferred embodiment of the invention these items will include: "switch off", "Personal", "Silent", "Discreet", "Loud" and possibly one or more further profiles created or stored by the user—and when the desired profile is highlighted the item, e.g. "Personal", is selected by pressing the softkey 8 having the softkey label 22 "OK", an information note shown in the third display will inform the user about the selected profile "Personal tones in use". After a few seconds the display will automatically change back to the idle state display shown as the first display in FIG. 3. This will for some of the profiles include a small icon indicating that e.g. silent or discreet profile has been selected. The term highlighted is used for items in the display that are currently targeted for selection. There may be an inverted video bar (contrast invert) on the item to indicate the selection. When an item is highlighted, all user actions will be directed on the item.

However the full profile menu for editing, selection etc, has to be accessed by selecting "Menu" in idle state (first display of FIG. 4) and thereby entering the menu structure of the phone by pressing the softkey 8. In the menu the user has to scroll through the list of selectable items 23 by using the cursor navigation k,ey 10—according to the preferred embodiment of the invention these items will include: "Phonebook", "Messages", "Call register", "Settings", "Call divert", "Games", "Calculator", "Clock", "Profiles" —for scrolling to the "Profiles" menu as illustrated in the second display in FIG. 4, and select the highlighted item by pressing the softkey 8 having the softkey label 22 "Select".

When the user selects "Profiles" a list of selectable items will occur. This list will as indicated in the third display of FIG. 4 include "Personal", "Silent", "Discreet", "Loud", "Profile name #1", "Profile name #2", where the last two items refer to one or more further possible profiles defined by the user or received from other users, while the first four items refers to profiles set from the factory. However some or all of these present profiles may also be edited. Now the user can move the cursor through the available profiles and select the desired one. No empty profiles will be listed.

According to the preferred embodiment of the invention the operation characteristics of the profile may be changed from the Profiles menu. Basically the following profiles are available:

Personal—This is the default setting.
Silent—Mutes all the phone tones. When the tones are off, a mute-icon is shown in standby mode.
Discreet—Sets the phone tones to be quiet.
Loud—Sets the phone tones to be loud.
Empty#1 and Empty#2 profiles are defined in the phone or sent to the phone from a remote terminal for storing as profiles. Preferably these two profiles will not appear in the menu as selectable profiles as long as the profiles are empty. However when a profile has been defined the profile name will occur as a selectable item in the profile list.

When the desired profile is highlighted the user selects the profile by pressing the softkey 8 now having the softkey label 23 "Option". When the user has selected one of the profiles e.g. "Personal" a list of selectable items will appear. This list will as indicated in the fourth display of FIG. 4 include "Use", "Personalise", and "Send". For editing a profile, the cursor 24 has to highlight "Personalise" and the user has to press the softkey 8 having the softkey label 22 "OK". Then a list of selectable items will appear, and this list will as indicated in the fifth display of FIG. 4 include adjustable settings as "Ringing tone", "Ringing volume", "Incoming call alert", "Message alert tone", "Keypad tones", "Warning and game tones", "Vibrating alert", and "Profile graphic ".

The menu item "Ringing tone" sets the ringing tone for voice calls. The user may scroll to the desired tone and select the highlighted ringing tone by pressing the softkey 8 having the softkey label 22 "OK". The tones received from somebody or composed by the user himself can be found at the end of the tone list containing the tones pre-stored from the factory.

The menu item "Ringing volume" sets the volume level for the ringing tone. The user may scroll to the desired level and select the highlighted level by pressing the softkey 8 having the softkey label 22 "OK".

The menu item "Incoming call alert" defines how the phone notifies you of incoming voice calls. The options are: "Ringing", "Ascending", "Ring once", "Beep Once", and "Off". When Off is selected, all phone tones are mute and a mute icon is displayed. The user may scroll to the desired option and select the highlighted option by pressing the softkey 8 having the softkey label 22 "OK".

The menu item "Message alert tone" sets the volume level for tone message alert tone. The user may scroll to the desired level and select the highlighted level by pressing the softkey 8 having the softkey label 22 "OK".

The menu item "Keypad tones" sets the volume level for keypad tones. The user may scroll to the desired level and select the highlighted level by pressing the softkey 8 having the softkey label 22 "OK".

The menu item "Warning and game tones" sets the phone to sound a warning tone, for example when the battery is running out of power. This setting has no effect on the tones that are related to network services.

The menu item "Vibrating alert" sets the phone to vibrate when you receive a voice call or a text message. This setting can also set the phone to first vibrate and then ring. The vibrating alert is disabled when the phone is connected to a charger or a desktop stand.

The menu item "Profile graphic" sets the picture that is displayed in idle state after a selected period of time (called "timeout"). The user can select from a couple of pre-stored animations or animations received from a remote terminal. An animation is a sequence of images being repeatedly refreshed in the display. The way this kind of animation work is explained in details in the U.S. Pat. No. 5,870,683 of the assignee.

In the profile graphic menu a first sub-menu item "Off,On" shows a previously selected profile graphic for a while, a second sub-menu item "Timeout" allows the user to set the time of the "timeout", while a third sub-menu item "Profile graphic" allows the user to select one of the available graphics. The operation is terminated when the user selects the highlighted graphic or the entered input by pressing the softkey 8 having the softkey label 22 "OK" or interrupted by pressing the "clear"-key 9.

The menu item "rename" allows the user to rename the profile. The user then selects a profile. The text editor of the phone is entered and the user may write the desired text, and this text becomes the new name of the selected profile by pressing the softkey 8 having the softkey label 22 "OK".

Figure 4:
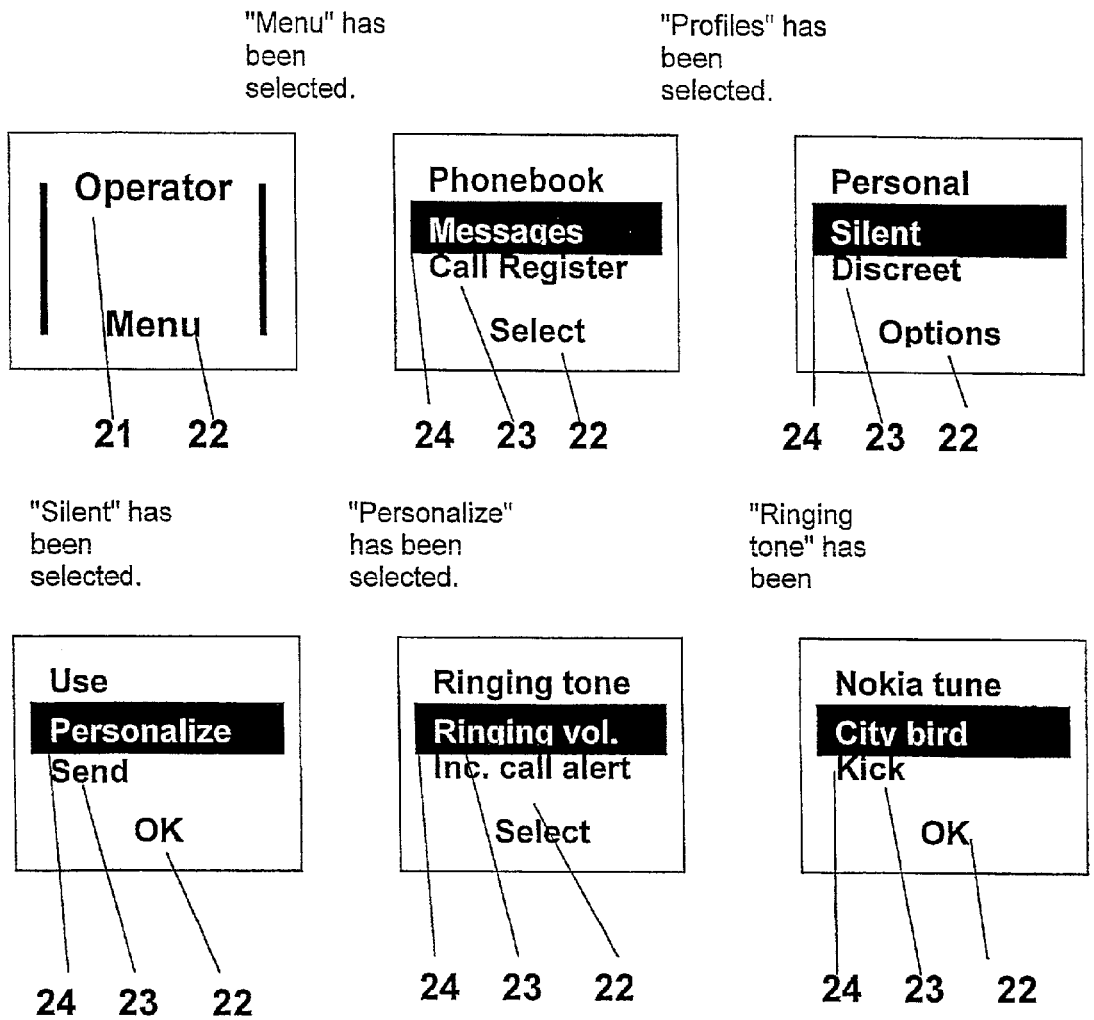
FIG. 4 shows a sequence of display for profile editing in a preferred embodiment of a communication terminal according to the invention.

In the sixth display of FIG. 4 the user may scroll through the entire list of available ringing tones and select the one he prefers. The same is done for all the other selectable settings the user wants to set. When a ringing tone is selected in the sixth display by pressing the softkey 8 having the softkey label 22 "OK", the phone jumps to the higher menu level shown in the fifth display of FIG. 4.

If the user does not want to change a setting he simply presses the "clear key" 9 and the phone goes one level up in menu. If the user continues to press the "clear key" 9 the user will go one level up in menu each time until it reaches the idle state with the first display of FIG. 4. Alternatively the idle state may be reached by long pressing the "clear key" 9 (for more than 0.8 sec).

Profiles transferred to a mobile communication terminal (e.g. a cellular phone) via a wireless network connection may be called Over-The-Air profiles or OTA profiles. OTA profiles are a new way to personalise the phone according to personal preferences. Similarly to normal profiles (pre-stored in the phone), they are used to adjust the phone for different situations of use.

The phone can receive part of the profile settings including the profile name, ringing tone and profile graphic as a smart message. This combination of settings is called an OTA profile. According to the preferred embodiment of the invention the received profile settings can be stored to two replaceable profiles (preset OTA profiles). The profile, its ringing tone and its profile graphic all have the same name, for example, "Café". The profile name "Café" will replace the Empty#1 name mentioned above and will occur in the menu showing selectable profiles.

According to a first aspect of the invention there is provided a method of handling operating characteristics of a profile in a mobile terminal, e.g. a cellular phone. The phone then has a number of user selectable profiles each including a group of user adjustable operating characteristics. Furthermore the phone is able to receive a message including a group of user adjustable operating characteristics from a remote terminal e.g. send as a message such as a SMS messages. Upon reception of such a message the phone analyses the message and identifies the individual user adjustable operating characteristics, and saves the group of user adjustable operating characteristics as a profile.

The graphics used in the profiles might be a simple bit-map image having a size fitting into the central part of the idle state display. Each pixel in such a bit-map image may in the most simple form only require one bit (black/white). After a user adjustable timeout the bit-map image will stay in the display as long as the phone stays in idle state once it has been activated. A 40 times 25 bits image will therefor only require 125 bytes.

However more complex graphics may be desired and this may for example be provided as a sequence of simple bit-map images, e.g., 3-5 images, and these individual images are shown sequentially with a refresh time set by the user. Advantageously these animations only have a duration corresponding to a few seconds. After the termination of the animation one of the images remains in the display for a while, e.g. 30 minutes, and the animation is repeated. However other events can trigger the animation, e.g. an input from a sensor detecting changes of the movements of the terminal.

Figure 5:
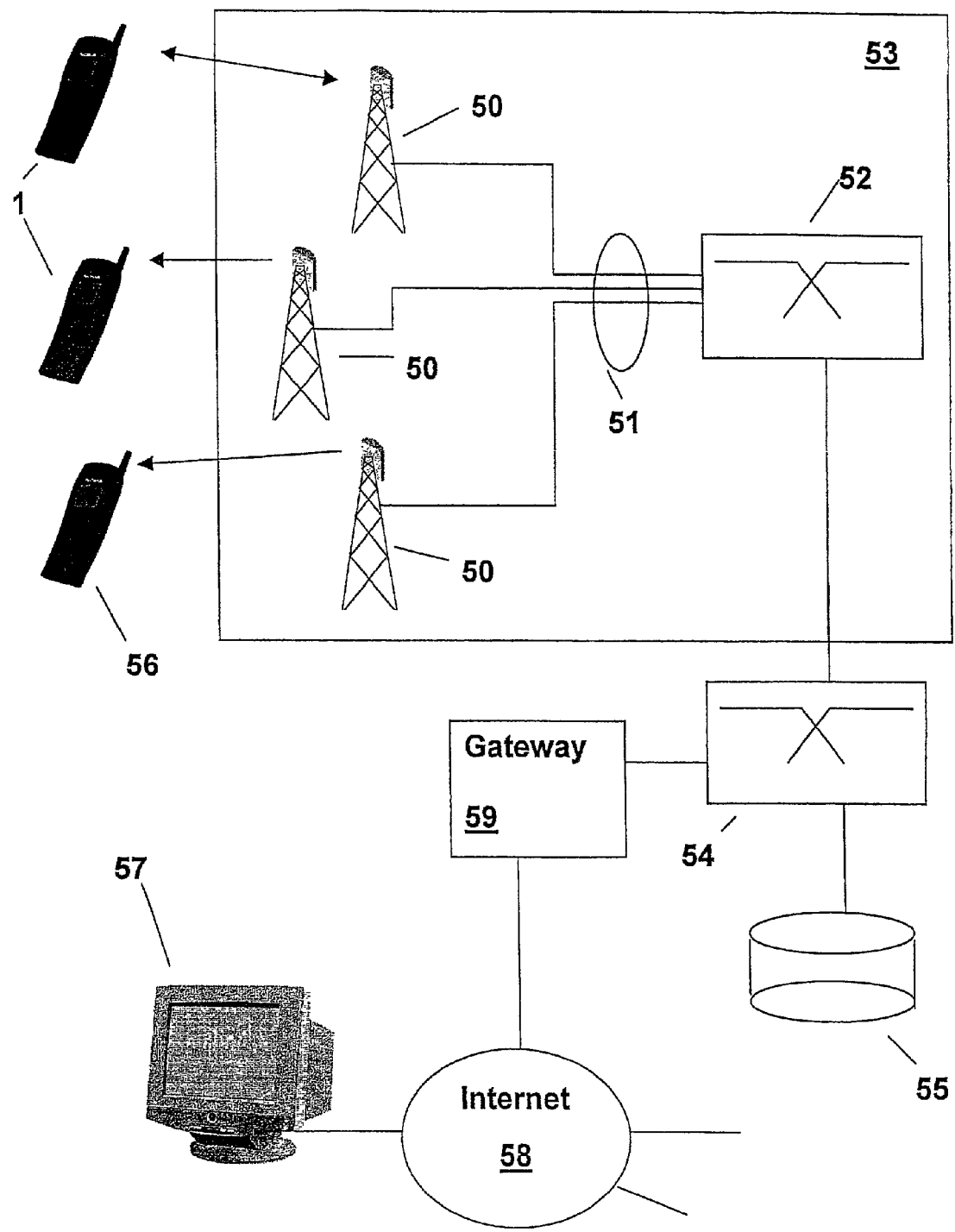
FIG. 5 shows a network in which profiles of terminals may be transferred according to the invention.

FIG. 5 illustrates in a schematic way the structure of a mobile communications system and connections for transmitting short messages e.g. according to the GSM specification. Mobile stations or cellular phones 1 are connected to base stations 50 (BTS) by means of radio communication. The base stations 50 are further connected, through an Abis interface 51, to a base station controller (BSC) 52, which controls and manages several base stations 50.

The entity formed by a number of base stations 50 and a single base station controller 52 is called a base station system (BSS) 53. The base station controller 52 manages radio communication channels and handovers. Furthermore the base station controller 52 is connected to a mobile services switching center (MSC) 54 via a so-called A-interface 55. The mobile services switching center 54 co-ordinates the formation of connections both from and to mobile stations. The mobile service switching center 54 connects the base station system 53 to the world outside the mobile communications network, e.g. to a short message service center (SM-SC) 55 managing the SMS activity in the mobile communications network.

When a user wants to send a short message (SMS) by means of the phone 1, the user writes or retrieves from the memory a message to be transmitted and gives the phone number of receiver of the message, i.e., an identifier of a receiving phone 56, to where the message is going to be transmitted. When sending a short message, the message goes from the phone 1 to the base station 50, and from there, through the base station controller 52 and the mobile services switching center 54, further to the short message service center 55. The short message is stored at the short message service center 55, from where it will be sent further to the receiving mobile station 56, and the route of the message will be in the same way as in transmission, but in the opposite direction. The short message service center 55 will be informed whether or not the mobile station 56 has received the short message. If not the short message will be re-transmitted.

In addition to this, short messages can be sent from a Personal Computer (PC) 57 e.g. in a special Internet application available at some network operators home page available via the Internet 58. In this case, the mobile services switching center 54 is in connection with a gateway server 59 (GTW), which again is in connection with the Internet 58. On this WWW page containing the special Internet message application, the user inputs the telephone number of the receiving phone 56 and the message to be transmitted, upon where the message can be sent from the Personal Computer (PC) 57, in which case it goes through the Internet 58 and the gateway server 59 to the mobile services switching center 54 and further to the short message service center 55, and further to the receiving phone 56 through the mobile communications network.

By means of the short message service (SMS) of the GSM system, it is presently possible to send a single message having a maximum length of which is 160 7-bit ASCII characters corresponding to 140 bytes. However by concatenating several individual messages into a concatenated message, a higher data content will be obtained.

Syntax of the Profile Transmission

The syntax of the profile transmission message is based on <line-feed>delimited presentation. The content is formatted as follows:

```
<profile-message>::= <profile-keyword><profile-body>
<profile-keyword>::= "Profile" <line-feed>;        'case-sensitive'
<profile-body> ::=
    [<name-field>] <line-feed>;                    'profile name'
    [<ringing-tone-field>] <line-feed>;
        <Ringing-Tone-programming-language>        (see below)
    [<ringing-volume>] <line-feed>;                'ringing tone level'
    [<incoming-call-alert>] <line-feed>;           'incoming-call-alert'
    [<message-alert-tone>] <line-feed>;            'message-alert-tone'
    [<keypad-tones>] <line-feed>;                  'keypad-tones'
    [<warning-tones>] <line-feed>;                 'warning-tones'
    [<vibrating-alert>] <line-feed>;               'vibrating-alert'
    [<graphic-field>] <line-feed>;
        <OTA-bitmap> ::= <Header><Image-data>      (see below)
```

According to the preferred embodiment of the invention any of the supplementary information fields (<ringing-tone-field> to <graphic-field>) may be absent, but as the syntax requires, that the field separators (<line-feed>) must be present.

Ringing Tone Format.

The ringing tone format is handset independent, and describes only the audio related information. A tune is intended to be saved in the terminal. They can be used to implement message notification with a special ringing tone.

```
<Ringing-Tone-programming-language> ::= <command>+
<command> ::=
    <command-length> <command-part>+ |
    <command-end>
<command-length> ::= 'binary [00000001 .. 11111111]. This indicates how
many command parts there are in the command. If necessary, filler bits are
added to ensure that <command-part> is always byte-aligned.'
<command-end> ::= 'binary [00000000]; This indicates the end of the ringing
tone programming language.'
<command-part> ::=
    <ringing-tone-programming> |
    <UNICODE> |
    <cancel-command> <cancel-command-specifier> |
    <sound> <sound-command-specifier>
The Ringing Tone programming requires that the order of the command parts
is the following: <ringing-tone-programming>, [<UNICODE>,] <sound>.
<cancel-command-specifier> ::= <UNICODE>
<sound-command-specifier> ::=
    <basic-song-type> <basic-song> |
<basic-song> ::= <song-title> <temporary-song>
<song-title> ::= <text-length> <text>
<text> ::= <default-char>+ |;        'UNICODE disabled'
    <UNICODE-char>+;                 'UNICODE enabled'
<text-length> ::= 'binary [0000 .. 1111] indicating how many characters are
used for the following text. For example, in case of unicode, this counts the
number of 16-bit unicode characters.'
<temporary-song> ::= <song-sequence-length> <song-sequence>
<song-sequence-length> ::= 'binary [00000000 .. 11111111]; Indicates how
many song patterns follow.'
<song-sequence> ::= <song-pattern>+
<song-pattern> ::=
    <pattern-header> |
    <pattern-header> <pattern-instruction>+
<pattern-header> ::= <pattern-header-id> <pattern-id> <loop-value> <pattern-
specifier>
<loop-value> ::= 'binary [0000 .. 1111]; Indicates how many times the pattern
should be repeated. Value zero means no repeat. Value binary 1111 means
infinite.'
<pattern-specifier> ::= <already-defined-pattern> | <length-of-the-new-
pattern>
<already-defined-pattern> ::= 'binary [00000000]; This indicates that a already
defined pattern is used again.'
<length-of-the-new-pattern> ::= 'binary [00000001 .. 11111111]; Indicates how
many pattern instructions there are in the song pattern. Value zero is illegal.'
<pattern-instruction> ::=
    <note-instruction> | <scale-instruction> | <style-instruction> |
    <tempo-instruction> | <volume-instruction>
```

Graphical Pictures and Animations

The OTA bitmap format enables graphical information to be sent to a wide variety of handsets. Depending on the handset implementation, it may be possible for the user to create graphical objects and then send them to other handsets. The OTA bitmap format is handset independent, and describes only the graphical information.

The OTA bitmap syntax will according to the preferred embodiment according to the invention give the follow data:

```
<OTA- bitmap>::= <Header> <Image- data>
<Header>::=< InfoField> [<ExtField>]* <Width> <Height> <Depth>
<InfoFieid>::= 'Octet which is defined in the Smart Messaging Specification'
<ExtField>::= 'Octet which is defined in the Smart Messaging Specification'
<Width>::= 'Horizontal width of the bitmap in pixels'
<Height>::= 'Vertical height of the bitmap in pixels'
<Depth>::= 'Number of colors or gray shades'
<Image- data>::= <Main- image> [<Animated- image>]*;'There can be 0 to
15 animated images'
<Main- image>::= 'Bitmap formed according to image data structure
description below'
<Animated- image>::= 'Bitmap formed according to image data structure
description below'
```

If the bitmap is bigger than display the bitmap is cropped so that bitmap is shown starting from upper left corner to the lower right corner of the display. Scanning of the pixels in a plane will be done row by row. Rows will be scanned from top to bottom and pixels inside the row will be scanned from left to right.

According to the present invention it is also possible to transmit a message with a bundle of content, by means of a remote terminal comprising operating characteristics for a communication terminal. The communication terminal can be a phone 1, 56, which comprises a number of user selectable groups of user adjustable operating characteristics. The remote terminal can be the PC 57 or the Internet 58, which comprises bundling means to generate a message including a group of user adjustable operating characteristics, e.g. a ringing tone and a graphical picture. The remote terminal further comprises transmitting means to transfer the message to the communication terminal via a communication channel, like using SMS or another kind of communication channel. Thus, content is transmitted from the remote terminal via a communication channel, which both can be done by means of the PC 57 or the Internet 58. Upon reception of the message, the communication terminal is able to save the group of user adjustable operating characteristics individually in each selectable group in the communication terminal. Thus, instead of sending a message in format of a profile, the content can be handled individually within a phone's 1 user selectable groups, which also increase the degree of freedom for the user to personalise the phone.

In addition, it can be possible to include bookmark information defining the location of a server document and/or a calendar note defining a date of an event, for being stored in a corresponding user selectable group. Using a browser, e.g. a WAP browser based on the Wireless Application Protocol, a bookmark comprising a link to a WAP page which can be added to a list of saved links. When a user is visiting a particular WAP site or home page and want to be able to quickly get back to it later, it is possible to create a bookmark for it. In this case it is also possible to include a bookmark in the message together with other content. WAP is a result of continuous work to define an industry wide standard for developing applications over cellular communication networks. This makes it possible to access for example the Internet or other kinds of information networks provided with hypermedia servers, from an ordinary cellular phone supporting WAP. A calendar note can be handled in a vCalendar format, which is an industry standard format for exchanging scheduling and activity-recording information electronically. If a vCalendar attachment is included in the message, it is possible to store this event in a personal information manager (PIM) type of application program and integrate with or relate it to a phone's calendar application. vCalendar was developed along with the vCard electronic business card specification, which also is possible to include in the message.

To transmit a message with a bundle of content it also increases the possibilities for a content provider to generate messages which can be dependent on the service as is intended. For example, it can be possible for a record company to have a server, which provides promotional content for a new artist or record like Madonna. In such case, the message could include a ringing tone of the new album, a picture of the artist as a graphic picture, a calendar note(s) of a possible tour, and bookmarks to the artist's (or record company's) WAP page. It could also be a server, providing event driven content, e.g. in connection to national holidays like Christmas or Chanukah. Similar to the promotional content, an event driven server could e.g. provide message including a ring tone (like "Jingle Bells"), a picture of Santa Claus, and calendar notes about the holidays, and a bookmark to Christmas related sites.

The syntax of a bundled message can be similar to the profile transmission message. The difference between a profile message and a bundled message is how the reception of the message on the phone. When the user receives a bundled message, it will be possible to accept the message, or even parts of it, and then handle the received user adjustable operating characteristics individually within a phone's 1 user selectable groups.

Figure 6:
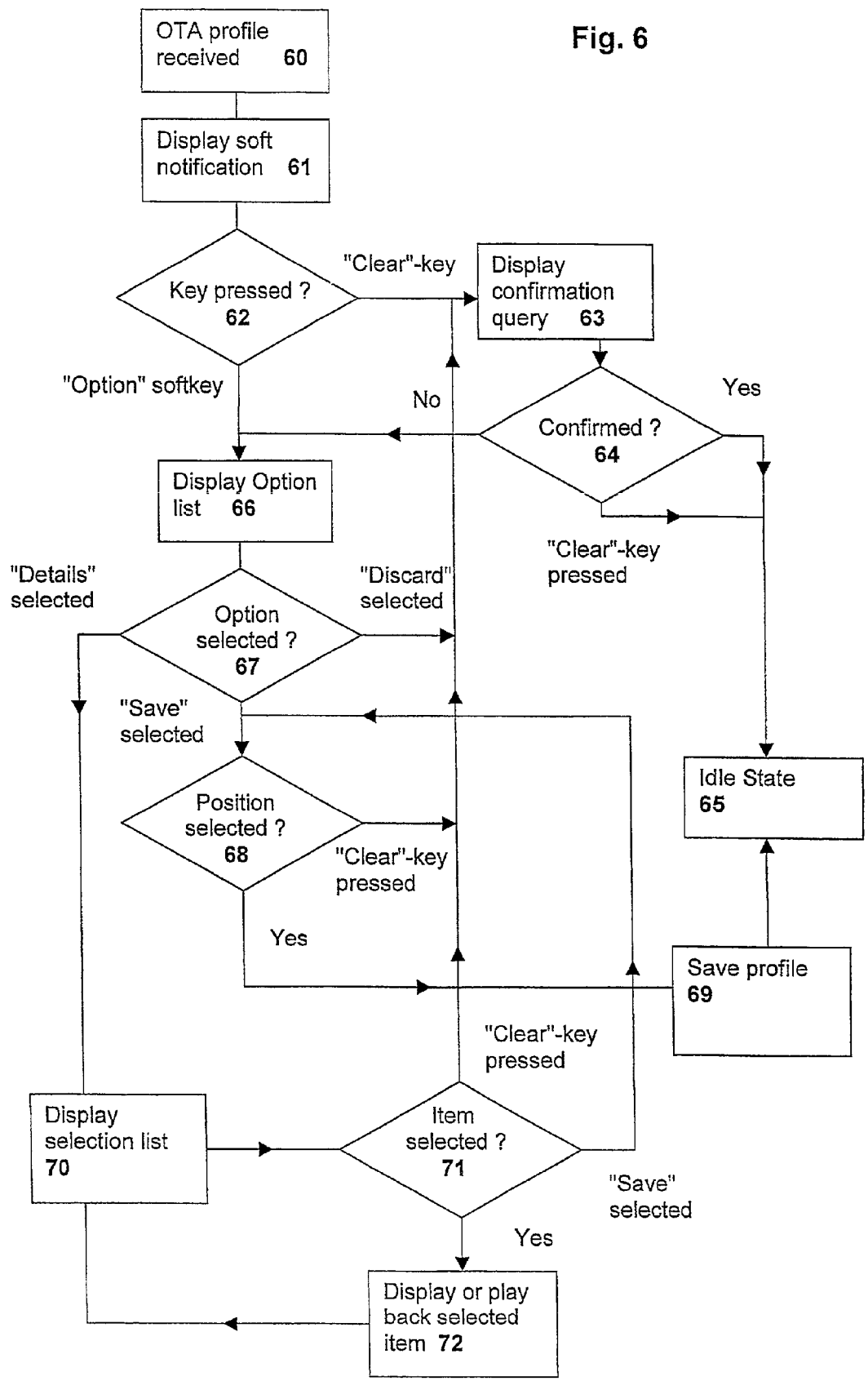
FIG. 6 is a flow diagram for illustrating the profile message reception in a preferred embodiment of a communication terminal according to the invention.
Figure 7:
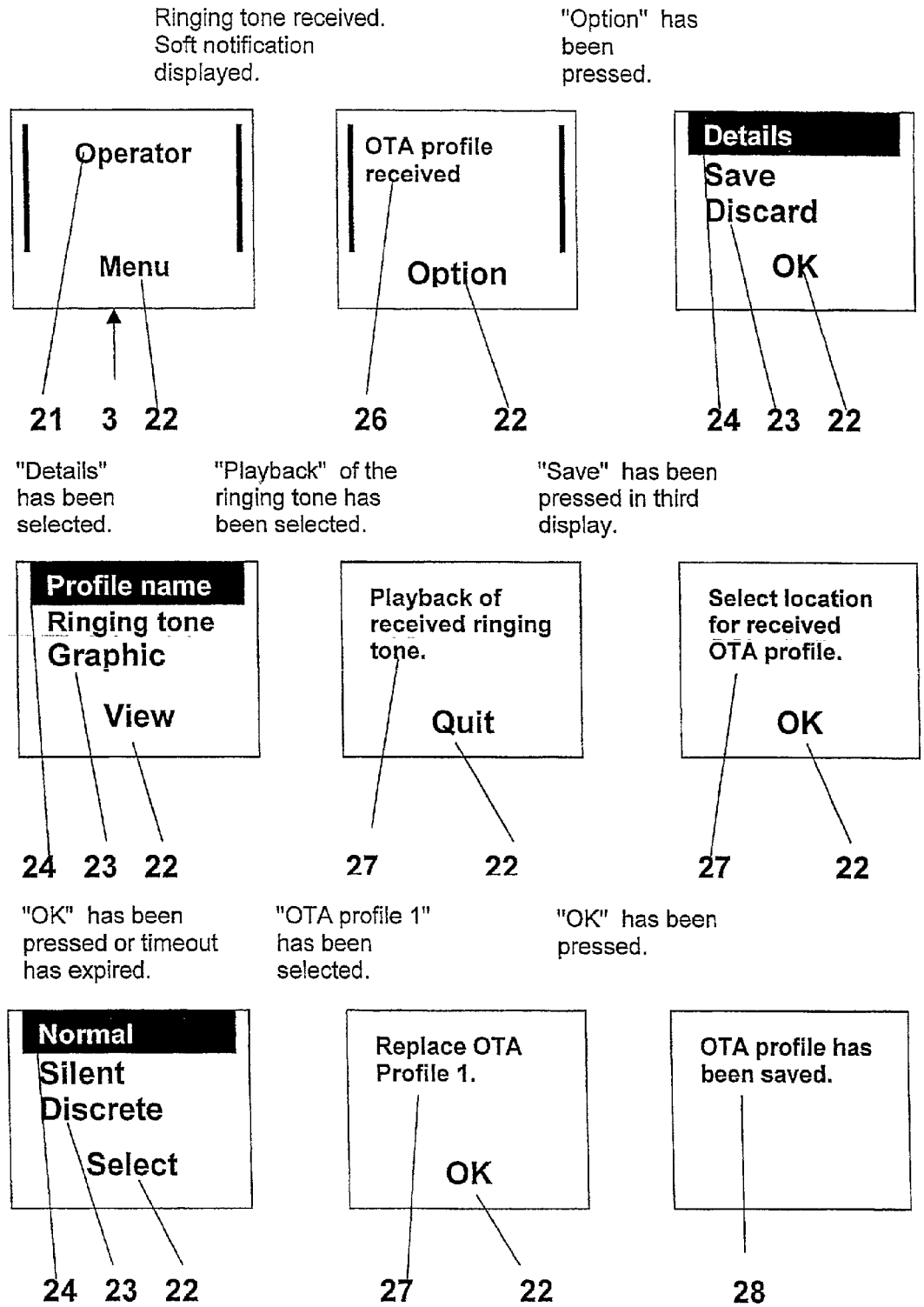
FIG. 7 shows a sequence of display for profile message reception in a preferred embodiment of a communication terminal according to the invention.

The embodiment described with reference to FIGS. 6 and 7 relates to an OTA profile message in which the message includes the profile name, a profile graphic acting as a screen saver, and a ringing tone. FIG. 6 shows a flow chart over the OTA Profile reception procedure and FIG. 7 shows a sequence of displays upon reception of the OTA Profile. When an OTA profile is received (step 60), an SMS Alert tone is played. A soft notification 26 "OTA Profile received" is displayed (step 61). Soft notifications inform the user of events that have typically occurred without the user having been involved. Normally, they are shown as display text.

The incoming profile can be discarded by pressing the "Clear key" 9 (step 62). However, after the "Clear key" 9 has been pressed, a confirmation query (step 63) with text "Discard received profile?" will be displayed. The softkey label of the softkey 8 is "OK". By pressing the softkey 8 at step 64 the phone exits to idle state (step 65), and discards the received OTA profile without saving the profile. Pressing the "clear key" 9 instead of confirming the discarding will cancel the operation; in other words, the OTA profile is not deleted and the phone returns to the softkey option list at step 66.

When the user upon the soft notification (the second display of FIG. 7) presses the softkey 8 having the softkey label 22 "Option", the phone 1 displays a selection list (in step 66) of the following selectable items:
Details
Save
Discard The softkey function is "OK". By selecting "Details" from the option list shown as the third display of FIG. 7, the phone will display a selection list 23 in step 70 of the selectable items:
"Profile name" —when "Profile name" is highlighted 24, the softkey label 22 is "view" the name of the profile.
"Ringing tone" —when "Ringing tone" is highlighted 24, the softkey label 22 is "playback" the ringing tone.
"Profile graphic" —when "Profile graphic" is highlighted 24, the softkey label 22 is "view screensaver".
"Save the profile".

When the user in step 71 selects the "Playback" softkey 8 the phone will play the received ringing tone for the user in step 72, and an information note 27 will as shown items in the fifth display of FIG. 7 be shown in the display 2. The softkey label 22 will change to "Quit" and the softkey functionality will be quitting the ringing tone playback. After the playing is interrupted or finished, the selection list with the selectable items (the fourth display of FIG. 7) is displayed again.

When the user in step 71 selects "View screensaver" when "Profile graphic" is highlighted the phone will display the profile graphic to the user. The softkey label will be "Back" and the softkey functionality will be quitting the inspection of the graphics. After the inspection in step 72 is interrupted or finished, the selection list with the selectable items is displayed again.

If the user in step 67 selects "Save" from the softkey selection list (third display of FIG. 7), or save from the details list in step 71, the phone displays an information note 27 as shown in the sixth display of FIG. 7 with the display text "Select location for the profile". After this the phone displays as shown in the seventh display of FIG. 7 all the profiles as a selection list. The user can in step 68 select the profile to be replaced.
Normal mode.
Silent mode.
Discrete mode.
Outdoor mode.
OTA Profile 1 (pre-programmed)
OTA Profile 2 (pre-programmed)

After the selection, the Confirmation Query "Replace profile U" is displayed as an information note 27 if U is the name of the replaced profile as shown in the eighth display of FIG. 7. The softkey label 22 is "OK". If the user confirms, the profile is saved in step 69 and a confirmation note 28 saying "OTA profile has been saved" is displayed as shown in the ninth display of FIG. 7, and the phone goes to the idle state.

Selecting "Discard" from the selection list in step 67, the phone will display the confirmation note query saying "Discard received profile" in step 63. If the user confirms in step 64 by pressing the soft key, the downloaded OTA profile is discarded and the confirmation note query saying "Profile discarded" is displayed. After this, the phone goes to the idle state.

What is claimed is:

1. A method comprising:
   receiving at a communication terminal a profile message;
   parsing the received profile message to identify a plurality of profile fields corresponding to terminal operating characteristics, wherein the profile message comprises at least two profile fields that correspond to any of the following: a ringing tone field, a ringing volume field, an incoming call alert field, a message alert tone field, a keypad tone field, a warning tone field, or a graphic field;
   displaying on the communication terminal a list of selectable options comprising at least a first option to save the received profile message, a second option to discard the received profile message, and a third option to review the plurality of profile fields in the received profile message,
      wherein upon receiving a user input selecting the second option the communication terminal is configured to allow a user to elect not to store one or more of the received plurality of profile fields in a memory of the communication terminal,
      wherein upon receiving a user input selecting the third option the communication terminal is configured to allow a user to play a ringing tone received with the profile message and to view a graphic received with the profile message, and wherein upon receiving a user input selecting the first option the communication terminal is configured to identify
   a first user profile out of one or more user profiles stored in the communication terminal, wherein each of the user profiles corresponds to a set of user preferences and settings that control the operation of the communication terminal, and further configured to store
   the plurality of profile fields as the first user profile in the communication terminal, and
   wherein upon selection of the first user profile, the communication terminal is configured to operate according to the received plurality of profile fields.

2. A method according to claim 1, wherein the received plurality of profile fields includes a ringing tone and at least one graphical picture.

3. A method according to claim 2 wherein the at least one graphical picture includes a plurality of individual pictures displayed successively in order to create an animation.

4. A method according to claim 3, wherein the animation becomes a screen saver for the communication terminal upon selection of the first user profile.

5. A method according to claim 1, wherein the plurality of profile fields includes at least one of a card defining contact information and a calendar note defining a date of an event.

6. A method according to claim 1, wherein the plurality of profile fields includes bookmark information defining the location of a server document.

7. A method according to claim 1, wherein the profile message is received from a remote server providing promotional content.

8. A method according to claim 1, wherein the profile message is received from a remote server providing event driven content.

9. A method according to claim 1, further comprising providing a display on the communication terminal allowing the user to discard one or more of the terminal operating characteristics from a received profile message after inspecting the plurality of profile fields included in the profile message.

10. A method according to claim 1, wherein the profile message includes a profile name label for the plurality of profile fields corresponding to terminal operating characteristics.

11. The method of claim 1,
    wherein upon receiving a user input selecting the first option to save the received profile message, the communication terminal is further configured to create a new user profile on the communication terminal based on the plurality of received profile fields.

12. The method of claim 1, wherein the profile message comprises one or more short message service (SMS) messages received at the communication terminal.

13. The method of claim 12, wherein the profile message comprises a plurality of concatenated SMS messages.

14. The method of claim 12, wherein the plurality of profile fields are separated within the one or more SMS messages using line feed characters.

15. The method of claim 1, wherein the plurality of profile fields comprises a first field having a first field identifier corresponding to a first data type, and a second field having a second field identifier corresponding to a second different data type.

16. A method comprising:
    receiving at a communication terminal a profile message including a plurality of profile fields corresponding to a group of terminal operating characteristics, wherein the profile message comprises at least two profile fields that correspond to any of the following: a ringing tone field, a ringing volume field, an incoming call alert field, a message alert tone field, a keypad tone field, a warning tone field, or a graphic field;
    displaying on the communication terminal a list of selectable options comprising at least a first option to save the received profile message, a second option to discard the received profile message, and a third option to review the plurality of profile fields in the received profile message,
       wherein upon receiving a user input selecting the second option the communication terminal is configured to allow a user to elect not to store one or more of the received plurality of profile fields in a memory of the communication terminal,
       wherein upon receiving a user input selecting the third option the communication terminal is configured to allow a user to play a ringing tone received with the profile message and to view a graphic received with the profile message, and wherein upon receiving a user input selecting the first option the communication terminal is configured to identify
    a first user-selectable profile out of one or more user-selectable profiles stored on the communication terminal, wherein each of the user-selectable profiles corresponds to a set of user preferences and settings that control the operation of the communication terminal, and further configured to update
    the set of user preferences and settings of the first user-selectable profile to correspond to the received plurality of profile fields, and
    wherein upon selection of the first user-selectable profile, the communication terminal is configured to operate according to the received plurality of profile fields.

17. A method according to claim 16, wherein the received plurality of profile fields includes a ringing tone and at least one graphical picture.

18. A method according to claim 17, wherein the plurality of profile fields further includes at least one of a card defining contact information and a calendar note defining a date of an event.

19. A method according to claim 17, wherein the plurality of profile fields further includes bookmark information defining the location of a server document.

20. A method according to claim 16, wherein the profile message is received from a remote server providing promotional content.

21. A method according to claim 16, wherein the profile message is received from a remote server providing event driven content.

22. An apparatus, comprising:
a processor; and
at least one memory including computer program code, the at least one memory and the computer program code configured to, with the processor, cause the apparatus at least to perform:
receiving a profile message including a plurality of profile fields corresponding to a group of terminal operating characteristics, wherein the profile message comprises at least two profile fields that correspond to any of the following: a ringing tone field, a ringing volume field, an incoming call alert field, a message alert tone field, a keypad tone field, a warning tone field, or a graphic field;
displaying on the apparatus a list of selectable options comprising at least a first option to save the received profile message, a second option to discard the received profile message, and a third option to review the plurality of profile fields in the received profile message,
wherein upon receiving a user input selecting the second option the apparatus is configured to allow a user to elect not to store one or more of the received plurality of profile fields in the at least one memory of the apparatus,
wherein upon receiving a user input selecting the third option the apparatus is configured to allow a user to play a ringing tone received with the profile message and to view a graphic received with the profile message, and
wherein upon receiving a user input selecting the first option the apparatus is configured to identify
a first user profile out of one or more user profiles stored in the at least one memory, wherein each of the user profiles corresponds to a set of user preferences and settings that control the operation of the apparatus, and further configured to store
the plurality of profile fields as the first user profile in the at least one memory of the apparatus; and
wherein the apparatus is configured to operate according to the received plurality of profile fields when the first user profile is selected on the apparatus.

23. The apparatus of claim 22, wherein upon receiving a user input selecting the first option to save the received profile message, the apparatus is further configured to display on the apparatus a user interface allowing a user to discard one or more of the received plurality of profile fields from the received profile message before configuring the apparatus to operate according to the received plurality of profile fields in the message.

24. The apparatus of claim 22, wherein the received plurality of profile fields comprises a ringing tone and at least one graphical picture.

25. The apparatus of claim 22, wherein upon receiving a user input selecting the first option to save the received profile message, the apparatus is further configured to create a new user profile in the memory of the apparatus based on the plurality of received profile fields.

26. The apparatus of claim 22, wherein the profile message comprises one or more short message service (SMS) messages.

27. The apparatus of claim 26, wherein the profile message comprises a plurality of concatenated SMS messages.

28. The apparatus of claim 26, wherein the plurality of profile fields are separated within the one or more SMS messages using line feed characters.

29. The apparatus of claim 22, wherein the plurality of profile fields comprises a first field having a first field identifier corresponding to a first data type, and a second field having a second field identifier corresponding to a second different data type.

30. A memory having stored therein executable instructions which, when executed, cause a communication terminal to perform:
receiving at the communication terminal a profile message;
parsing the received profile message to identify a plurality of profile fields corresponding to terminal operating characteristics, wherein the profile message comprises at least two profile fields that correspond to any of the following: a ringing tone field, a ringing volume field, an incoming call alert field, a message alert tone field, a keypad tone field, a warning tone field, or a graphic field;
displaying on the communication terminal a list of selectable options comprising at least a first option to save the received profile message, a second option to discard the received profile message, and a third option to review the plurality of profile fields in the received profile message,
wherein upon receiving a user input selecting the second option the communication terminal is configured to allow a user to elect not to store one or more of the received plurality of profile fields in the memory of the communication terminal,
wherein upon receiving a user input selecting the third option the communication terminal is configured to allow a user to play a ringing tone received with the profile message and to view a graphic received with the profile message, and
wherein upon receiving a user input selecting the first option the communication terminal is configured to identify
a first user profile out of one or more user profiles stored in the communication terminal, wherein each of the user profiles corresponds to a set of user preferences and settings that control the operation of the communication terminal, and further configured to store
the plurality of profile fields as the first user profile in the communication terminal, and
wherein upon selection of the first user profile, the communication terminal is configured to operate according to the received plurality of profile fields.

31. The memory of claim 30, wherein the received plurality of profile fields includes a ringing tone and at least one graphical picture.

32. An apparatus, comprising:
a processor; and
at least one memory including computer program code, the at least one memory and the computer program code configured to, with the processor, cause the apparatus at least to perform:
receiving at the apparatus a profile message from a remote terminal via a wireless communication network;
parsing the received profile message to identify a plurality of profile fields corresponding to terminal operating characteristics, wherein the profile message comprises at least two profile fields that correspond to any of the following: a ringing tone field, a ringing volume field, an incoming call alert field, a message alert tone field, a keypad tone field, a warning tone field, or a graphic field;

displaying on the apparatus a notification indicating that a profile message has been received at the apparatus;

displaying on the apparatus a list of selectable options comprising at least a first option to save the received profile message, a second option to discard the received profile message, and a third option to review the plurality of profile fields in the received profile message, wherein upon receiving a user input selecting the second option the apparatus is configured to allow a user to elect not to store one or more of the received plurality of profile fields in the at least one memory of the apparatus, wherein upon receiving a user input selecting the third option the apparatus is configured to allow a user to play a ringing tone received with the profile message and to view a graphic received with the profile message, and wherein upon receiving a user input selecting the first option the apparatus is configured to identify a plurality of user profiles stored in the at least one memory of the apparatus, wherein each of the user profiles corresponds to a set of user preferences and settings that control the operation of the apparatus;

displaying on the apparatus a list of selectable items corresponding to the plurality of user profiles;

receiving a user input associating a displayed selectable item corresponding to a first user profile with the received plurality of profile fields;

in response to said user input, storing the plurality of profile fields as the first user profile in the at least one memory of the apparatus;

receiving a second user input selecting the first user profile as the operational profile on the apparatus; and in response to said second user input, configuring the apparatus to operate according to the received plurality of profile fields.

* * * * *